Sept. 13, 1938.  T. J. HOSKINS  2,129,766

RADIO AERIAL FOR AUTOMOBILES

Filed Feb. 19, 1937

INVENTOR
T. J. Hoskins

BY
ATTORNEY

Patented Sept. 13, 1938

2,129,766

UNITED STATES PATENT OFFICE 2,129,766

RADIO AERIAL FOR AUTOMOBILES

Travis J. Hoskins, Oakdale, Calif.

Application February 19, 1937, Serial No. 126,589

2 Claims. (Cl. 250—33)

This invention relates generally to radio aerials and in particular relates to an improved radio aerial for use on automobiles.

Modern automobiles, in most instances, now are provided with all metal bodies and tops and, as a result, it is no longer feasible to conceal a horizontally disposed aerial between the metallic top and interior lining as the metallic top prevents proper radio reception.

After the introduction of metallic automobile tops or so called "turret tops", various types of aerials were introduced and adapted for horizontal mounting beneath one of the automobile running boards. This type of aerial was subject to two objections. First, a horizontal mounted aerial, whether in the automobile top or under the running board, is disposed in a plane parallel to the plane of high power transmission wires, trolley wires and the like. This fact results in increased radio disturbance or "static" from the induction of such conductors of electricity when the automobile is close by.

Secondly, an aerial mounted beneath the running board of an automobile is subject to frequent damage as it easily strikes raised objects in the roadway or is struck by objects thrown from the adjacent wheels.

It is therefore one of the objects of my invention to provide an automobile radio aerial for arrangement in connection with the radiator grille and in such position to be relatively free from possible damage.

A further object of my invention is to provide an automobile radio aerial which, when mounted in position, is disposed in a plane at substantially right angles to the plane of high power transmission wires, trolley lines and the like thereby affording better radio reception due to the resultant reduction of interference.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
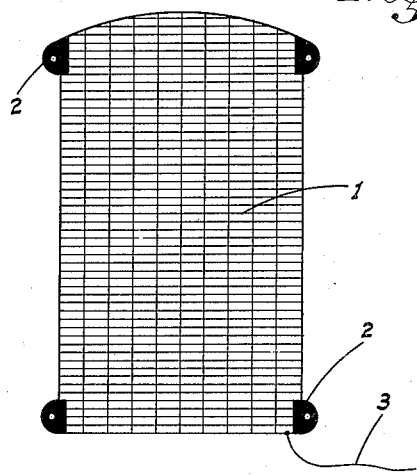
Figure 1 is a front elevation of one form of my invention.
Figure 2:
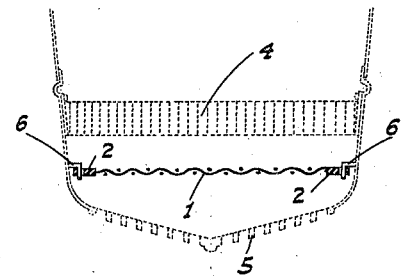
Figure 2 is a sectional plan view of the aerial shown in Fig. 1 as secured in combination with a radiator grille structure of an automobile.

Referring now more particularly to the characters of reference on the drawing, and particularly at present to Figs. 1 and 2, the numeral 1 indicates a sheet of wire mesh screen of substantially rectangular configuration. At its corners, the screen sheet is provided with supporting ears 2 preferably of rubber or other dielectric material. A lead wire 3 is connected at one end with the screen sheet 1.

The screen sheet aerial when in use is mounted in a substantially vertical position between the radiator 4 and grille 5 by suitable means such as brackets or hooks 6 engaging and secured to the ears 2. The lead wire 3 is carried rearward and is connected to the radio set wherever mounted in the automobile.

When so mounted, the sheet screen aerial cannot readily be damaged and, due to its substantially vertical position, reception is much better due to lessening of interference. The reduction of interference is due to the fact, as above indicated, that the source of interference and radio aerial on the automobile are in planes which extend substantially at right angles to each other.

Figure 4:
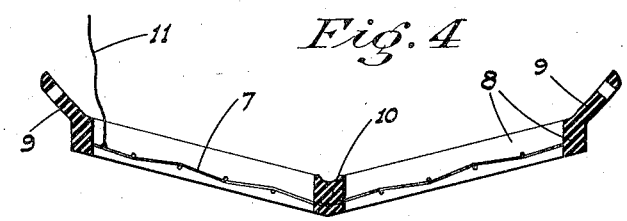
Figure 4 is a sectional plan view of the aerial shown in Fig. 3.
Figure 3:
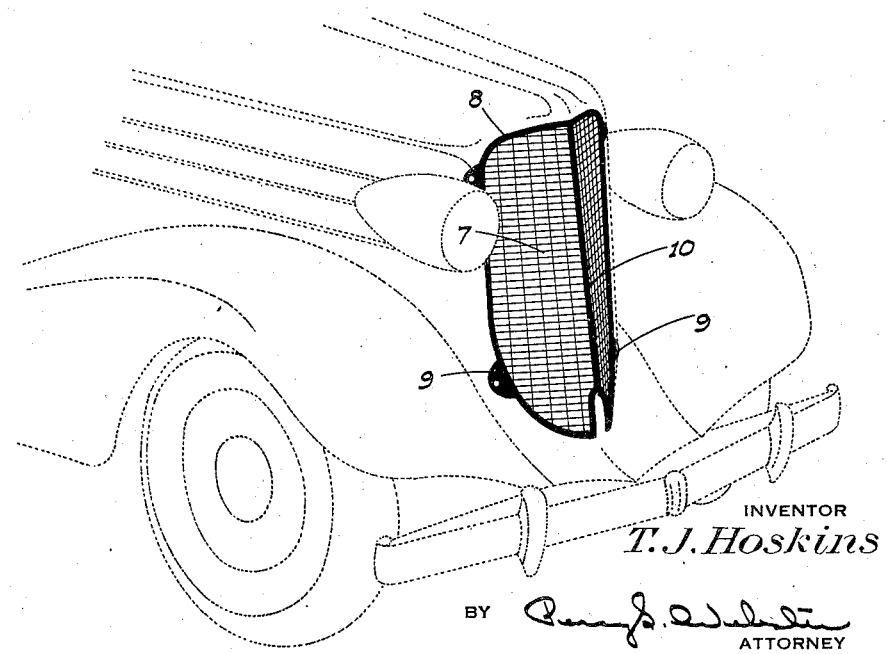
Figure 3 is a perspective view of another form of my invention as arranged in connection with the exterior of an automobile radiator grille.

Referring now to the form of the invention illustrated in Figs. 3 and 4, the numeral 7 indicates a sheet of wire mesh screen of such configuration as to be symmetrical with and to follow the transverse exterior contour of the radiator grille of an automobile upon which the aerial is mounted in the manner hereinafter set forth.

The sheet screen 7 is entirely bordered with a supporting and insulating frame 8 of dielectric material preferably of relatively soft or cushion rubber vulcanized onto the sheet screen. Spaced ears 9 project from each side of frame 8 and are employed to secure the aerial to the exterior of an automobile grille in the manner illustrated in Fig. 3. A central rib 10, also preferably rubber, extends from top to bottom of the sheet screen. The frame 8 and rib 10 are of sufficient thickness to support the sheet screen aerial in spaced relation from the grille thereby preventing the aerial from engaging the metallic grille and grounding. A lead wire 11 extends from the sheet screen 7 to the radio set within the automobile.

The form of aerial last described is not only ornamental in appearance but has the same advantageous characteristics as the other described form of the invention.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In combination with an automobile having a radiator grille, a sheet screen radio aerial, said aerial being substantially symmetrical with and of substantially the same transverse configuration as the grille, means mounting the aerial in front of the grille, said means comprising a frame of dielectric material surrounding the sheet screen, and means mounting the frame in face to face engagement with the grille; the frame being of sufficient thickness to support the sheet screen in spaced relation to the grille and including a central rib of dielectric material extending from top to bottom of the frame exteriorly of the sheet screen and engaging the central portion of the grille thereby preventing the sheet screen intermediate the frame from contacting the grille.

2. An automobile aerial comprising a sheet screen having substantially the same transverse configuration and symmetrical with the grille of an automobile on which the aerial is adapted to be attached, a continuous dielectric frame formed in connection with and surrounding the sheet screen, a central dielectric rib extending from top to bottom of the frame exteriorly of the inner face of the screen, and means to secure the frame on an automobile grille.

TRAVIS J. HOSKINS.